3,113,044
SUGAR BEET PROCESSING
Paul W. Alston, 1042 Oxford St., Berkeley 7, Calif.
No Drawing. Filed Mar. 17, 1961, Ser. No. 96,366
7 Claims. (Cl. 127—48)

The present invention relates to a new and improved process for the preparation of beet sugar. Particularly contemplated by the present invention is the step of evaporating limed and carbonated beet sugar diffusion juice to form a thick juice whereby the quantity of lime necessary for beet sugar processing is significantly diminished, the problem of evaporator fouling inherent in prior methods is obviated, and sugar of significantly improved quality is obtained. Other advantages of the present invention will be apparent from the following description read in conjunction with the appended claims. The present application is a continuation-in-part of copending application Serial No. 552,523, filed December 12, 1955.

In accordance with the present invention, partially purified limed and carbonated sugar beet diffusion juice is evaporated and again limed and carbonated after which the juice is filtered. The expression "partially purified" employed herein refers to the initial purification of the diffusion juice which may be accomplished by the standard double carbonation system; by any of the several modifications of this conventional system; or for best results by the method described in above identified copending parent application, which comprises essentially liming diffusion juice and filtering under controlled conditions before carbonation.

Sugar bearing diffusion juice is conventionally obtained from sugar beets by screening and washing the beets to remove dirt, slicing the beets into thin strips in a beet slicer and extracting the sliced sugar beets with hot water. This hot water extraction step is carried out in conventional diffusion batteries or in continuous diffusers. Dissolved and colloidal non-sugar impurities such as organic acids, amino acids, pectins, proteins and the like are extracted from the beets by the hot water along with the sugar itself. Unless such impurities are removed from the unpurified diffusion juice the excessive scale formation and foaming caused by these impurities causes difficulty in concentrating the juice by evaporation. Moreover, crystallization of sugar from unpurified diffusion juice is exceedingly difficult.

In accordance with conventional methods, purification of the sugar diffusion juice is accomplished by precipitating impurities with an excess of lime in the form of milk of lime, carbonating the limed diffusion juice with carbon dioxide in order to precipitate the unreacted excess lime in the form of calcium carbonate and to adsorb additional impurities on the calcium carbonate precipitate, and finally separating the coagulated impurities and calcium carbonate precipitate from the diffusion juice by any conventional means, such as filtration. In the commonly used double carbonation system, the diffusion juice is limed and carbonated to a pH of between about 10.3 and 10.5 to precipitate impurities, the treated juice is conveyed to a settler where the precipitate falls to the bottom, the clear juice is then again carbonated to a pH of about 9.0 to 9.3 to precipitate excess lime, the juice is treated with $SO_2$ and then filtered. In most diffusion juice purification systems, a total of from about 2 percent to 3 percent by weight of lime based on the weight of beets employed is added to the diffusion juice.

Modifications of the conventional purification method for beet diffusion juice are well known in the art. For example, a preliming process is sometimes utilized in which less than 1 percent by weight of lime is added slowly in increments before carbonation and the the main addition of lime. This stepwise preliming procedure results in the precipitation of colloids that coagulate at low alkalinities and reduce the tendency of such coagulated colloids to redissolve as more lime is added. However, even with preliming the main addition of excess lime causes some of the impurities that were coagulated by the preliming to redissolve. Furthermore, regardless of the method by which the lime is added, carbonation of the limed diffusion juice before the coagulated impurities are filtered reduces the alkalinity of the diffusion juice to about pH 10.0 or less which is less alkaline than the pH at which the maximum amount of impurities remain in the form of a precipitate, i.e. from approximately pH 10.8 to about pH 11.6. Hence, though this modified method for the purification of beet diffusion juice has some advantages, a significant amount of impurity remains in the diffusion juice.

Any of these conventional methods may be used to provide the partially purified juice which is processed in accordance with the present invention. However, the amount of lime employed to provide the partially purified juice by these conventional methods is reduced when the juice is to be further purified by the method of this invention in order to provide a saving in the amount of lime which is used. It is only important that the juice be partially purified by liming and carbonation before it is evaporated with crystalline precipitate remaining in the juice in accordance with this invention, and the evaporated juice then limed and carbonated.

The most effective method of partially purifying beet diffusion juice before evaporation and liming together with carbonation in accordance with this invention is disclosed in detail in the above identified copending parent application of which the present application is a continuation-in-part. In accordance with this method, purification of the unfiltered diffusion juice is effected by adding lime to the juice while keeping the juice gently moving at a rate below that a which the precipitate of impurities formed with the lime breaks up, and continuing the addition of lime until strong, somewhat granular curds of precipitated impurities are formed in a clear juice. Diffusion juice treated in this manner is readily filterable.

For optimum precipitation of impurities and filtration of the coagulated precipitate, the lime is added in increments at spaced intervals thus permitting the stabilization of the precipitate which forms at different alkalinities. This incremental stabilization process builds up a strong precipitate of impurities which does not readily disintegrate. The precipitated impurities are then separated from the juice without prior carbonation after which the filtrate is treated in the novel manner which comprises the gist of the present invention.

The amount of lime required to produce a readily filterable precipitate of impurities in accordance with this method varies with each different juice depending upon the type of plant, length of storage, and variables in the initial extraction of the juice from the plant. When lime is added slowly to the juice accompanied by gentle stirring which does not break up the precipitate, a fine precipitate is initially formed, followed by the appearance of large gelatinous clouds of flocculent precipitate in turbid juice, and then by smaller and more compact curds in clear juice, at which point the optimum filterability is approached. Consequently, the appearance of the precipitate and the clarity of the diffusion juice may be utilized as indicia for indicating when sufficient lime has been added to the juice to produce a readily filterable precipitate.

If the amount of lime is slightly above or below the optimum, the filtration rate of the limed juice is appreciably reduced, and the character of the precipitate is changed. Prior methods have either utilized an amount of lime below or above the amount for optimum filtration, or have employed agitation of the juice that was sufficient to cause disintegration of the cards of precipitated impurities into small particles that retard passage of diffusion juice through a filter.

The most accurate method of determining the optimum amount of lime for addition to the juice to provide a filterable precipitate of strong curds is to measure the filtration rate of a sample of the juice after each stepwise addition of a small amount of lime. When the filtration rate reaches a maximum and begins to decrease upon further addition of lime, the amount of lime required for optimum filtration has been established.

The precipitate of impurities obtained by this method is readily filterable without carbonation, and is composed of relatively strong curds of impurities. These curds are not obtainable by any other method of diffusion juice purification. Since the point of optimum filterability corresponds to the point at which the maximum proportion of impurties are present as a filterable precipitate, a filtrate of high purity is readily obtained. Furthermore, the total amount of lime required for purification of the juice in accordance with this method is less than the amount employed for purification by the other means described. This decrease in the amount of lime required for purification results in substantial savings when the method is utilized for treatment of the large amount of diffusion juice that is purified in a sugar refinery.

For purposes of clarification and completeness, the method of partially purifying diffusion juice in accordance with the method described in the above identified copending application will be discussed in greater detail. Although the unpurified diffusion juice may be maintained at any temperature up to the boiling point during the initial addition of lime, a smaller amount of lime is required to precipitate impurities in a cool diffusion juice than is required for a warm juice. The lime forms an appreciable amount of calcium saccharate when the temperature of the juice is in excess of about 70° C., and thus all of the lime is not completely utilized for precipitation of impurities. Consequently, for reasons of economy, the initial quantity of lime for production of a filterable precipitate is desirably added to diffusion juice that is not above about 70° C. However, once the desired precipitate has been formed, the limed diffusion juice is advantageously heated in order to increase the filtration rate during separation of the precipitated impurities.

Lime employed for purification of the diffusion juice is most conveniently added in the form of milk of lime, which is a suspension of calcium hydroxide in an aqueous solution. Other forms of lime such as the calcium saccharates or saccharate milk may also be employed. In addition, equivalents of lime, namely other alkaline earth alkalis, such as barium hydroxide may be utilized, although such compounds are presently considered unduly expensive for commercial operations.

The desired filterable precipitate of impurities is obtained by adding lime to the diffusion juice while the juice is kept in gentle motion without turbulence during formation of the precipitate, and by continuing addition of lime until a readily filterable precipitate of relatively strong curds in a clear solution is obtained. Best results are obtained with constant gentle stirring, but intermittent stirring may be employed.

During the period in which lime is added to the diffusion juice, the juice is stirred at a rate below that which causes the precipitate to break up. If the limed diffusion juice is stirred or allowed to flow at a rate that produces turbulence, the curds of precipitated impurities disintegrate into particles which block passage of the diffusion juice through the filter and render direct filtration impractical. The determination of whether or not the rate of stirring or movement of the diffusion juice is sufficiently slow to enable strong curds of precipitate to form is easily made by visual observation of the precipitate during addition of the lime. If the flocculent precipitate breaks up, the stirring rate or motion of the diffusion juice is reduced until the disintegration no longer occurs.

Stepwise addition of lime to the diffusion juice in increments at spaced intervals, accompanied by gentle stirring is desirable for best results in forming a readily filterable precipitate. Although a filterable precipitate may be obtained by fairly rapid addition of the major proportion of the lime followed by slow addition of lime up to the amount desired, the filter tends to become blocked and the rate of filtration is substantially reduced compared to a precipitate formed by lime added in increments. Consequently, the lime is advantageously added in at least two or three steps, accompanied by an interval at least a minute before further addition of lime, in order to allow the precipitate to become stabilized. However, the continuous addition of lime at a very slow rate over an extended period produces results equivalent to actual stepwise addition of lime, and may be employed. Consequently, whenever stepwise addition of lime is referred to, it is also meant to include such slow continuous addition.

Since the character of the diffusion juice varies because of differences in the type and treatment of the beets and because of variables in the diffusion process, a particular numerical amount of lime that will produce a satisfactory rate of filtration for all diffusion juices will not usually be the same for all such juices but can be readily ascertained by simple tests. For example, when lime is added to the diffusion juice in increments with gentle stirring in accordance with this invention, visual observation of the precipitate and the diffusion juice indicate when sufficient lime has been added. As lime is added to the diffusion juice, a fine precipitate is initially formed, followed by the appearance of large flocculent clouds of gelatinous precipitate in a turbid liquid, and then by smaller and more solid curds in a substantially clear liquid when sufficient lime has been added to provide a precipitate that is readily filtered. Further addition of lime before filtration of the precipitate only reduces the rate at which the precipitated impurities can be filtered from the diffusion juice.

The diffusion juice is considered clear for purposes of determining filterability by visual inspection even though the liquid is colored, provided that it is not substantially turbid. The large flocculent precipitate that occurs in a turbid solution just prior to the formation of the readily filterable precipitate is usually primarily composed of particles larger than about ¼ inch in diameter. When the optimum amount of lime has been added, the precipitate changes into relatively granular curds less than about $\frac{1}{16}$ inch in diameter suspended in clear diffusion juice.

The most accurate means of determining the amount of lime required for formation of a precipitate that provides an optimum rate of filtration, is to add lime in small increments to a sample of the diffusion juice with gentle stirring, and measure the rate of filtration of a portion of the sample after each addition of lime. Since the optimum lime addition is generally not approached until the solution begins to clear and the large gelatinous precipitate begins to change into granular curds, it is usually not necessary to commence measurements of the filtration rate before such time. The filtration rate increases rapidly with very small additions of lime as the amount of lime approaches the quantity that provides a maximum rate of filtration. After the optimum amount of lime has been added, further addition of lime results in a marked decrease in the rate of filtration of the diffusion juice. Consequently, the desired quantity of lime for best filtration of any particular diffusion juice is readily determined from a comparison of filtration rates obtained with increasing amounts of lime, and by employing the amount that provides a maximum rate of filtration.

For example, a suitable method of determining the proportional amount of lime required to produce a precipitate that is readily filterable is to place a sample of about 1500 ml. of the diffusion juice in a two liter beaker, and add small increments of about 0.05 percent by weight CaO based on the weight of beets diffused, while stirring gently. The additions of lime are spaced about two minutes apart to permit the precipitate to stabilize. When a heavy voluminous precipitate has formed, the clarity of the supernatant diffusion juice is observed after a wait of about three minutes. If the juice is still turbid, additions of lime are continued in smaller increments of about 0.01 percent of CaO based on the weight of beets diffused. As soon as the diffusion juice commences to become clear, and the large flocculent precipitate begins changing into a smaller more granular form, filtration tests are commenced.

The filtration tests are readily conducted by transfer of about 300 ml. of the limed diffusion juice from a beaker to a stemless funnel fitted with a filter that provides rapid filtration and a clear filtrate. The type of filter employed in beet tare laboratories, such as the creped long fibered filter papers sold by Reeve-Angel under the trademark Reeve-Angel Nos. 201, 202 or 226 are examples of suitable filter papers. The volume of juice filtered in any selected period of time, such as one minute, is determined after each addition of a small increment of lime until further lime addition results in a lowering of the filtration rate. Generally, any rate of filtration faster than 80 ml. per minute for a 4 inch diameter funnel and Reeve-Angel filter paper No. 226 indicates that a readily filterable precipitate has been obtained.

The amount of lime added to the diffusion juice may be measured in terms of the percent by weight of lime based upon the weight of beets diffused, which is a measure commonly employed in the sugar industry, or by means of the conventional pH of the limed diffusion juice. Because of reactions of lime at various concentrations with impurities in the diffusion juice, the pH does not increase in proportion to the amount of lime with each addition of lime. Nevertheless, the pH of the limed diffusion juice provides a measure of the lime concentration that may be duplicated as long as a consistent method of determining the pH is employed, and the pH is most conveniently utilized for controlling the quantitiy of lime added to diffusion juice in a continuous automatic liming apparatus. The pH of the limed diffusion juice may readily be determined by a pH meter, such as a glass-calomel electrode.

Periodic determinations of the optimum amount of lime required for optimum filtration of the limed juice are regularly made whenever any conditions of extraction are varied. With most beet diffusion juices, the optimum amount of lime for best filtration is at a pH somewhere between 10.8 and 11.6, or between 0.20 and 0.60 percent by weight CaO based on the weight of beets diffused.

After the optimum amount of lime has been added to the diffusion juice in accordance with this method, the juice is preferably heated to increase the rate of filtration. Though a broad range of temperatures below the boiling point of the diffusion juice is satisfactory, a temperature of between 70° C. to 90° C. is preferred, since this range provides optimum filtration without unduly increasing the color of the diffusion juice. As previously explained, the juice is preferably heated after the lime has been added rather than prior to addition in order to reduce the quantity of lime required for provision of a readily filterable precipitate.

The limed diffusion juice is then separated from the precipitate in any conventional manner. A filter that subjects the flocculated curds of precipitate to a minimum amount of pressure during filtration is preferred so that the precipitate is not compressed into a relatively nonporous cake that prevents filtration. Any filter that operates under a low head of liquid pressure may be employed. However, a preferred form of filter is disclosed in detail in applicant's Patent No. 2,880,875 for "Filtration Apparatus and Method." Although decantation may be used to separate the juice from the curds of precipitated impurities, it is a slow and inefficient process since the precipitate settles very slowly.

When this filtrate is to be evaporated by the method of the present invention it is first carbonated to reduce the alkalinity so that subsequent addition of lime will not raise the alkalinity above the point at which serious foaming will occur in the next carbonation step. The temperature of this carbonation step is not critical and is preferably conducted at the temperature of the juice as it comes from the filter. Carbonation is continued until the alkalinity is below about pH 10, and generally between about pH 9.5 and pH 10.0.

The carbonated juice is next treated with a small quantity of lime, preferably from about 0.10 percent to 0.20 percent by weight of sugar beets in order to reduce the lime salt content. Though the quantity of lime added may vary somewhat, it has been found that additions of lime below 0.10 percent do not significantly decrease the lime salt content. Above quantities of 0.20 percent, on the other hand, the lime is relatively ineffective and the process becomes prohibitively expensive. The lime employed is preferably added in the form of milk of lime, i.e. a suspension of calcium hydroxide in aqueous solution. It should be understood, however, that other forms of lime such as calcium saccharates or a saccharate milk may also be employed.

The limed filtrate is now carbonated to an alkalinity which provides a low lime salt content, as determined by standard laboratory methods, in which varying end points are tested to determine the point at which minimum lime salt content is obtained. Hence, the preferred alkalinity is defined as the pH value at which a low lime salt content, and preferably the minimum lime salt content, is obtained rather than a narrow range of pH values. Generally, this alkalinity is between about pH 8.8 and pH 9.5, which is the normal pH of the second carbonation in conventional processing by the double carbonation method for treatment of sugar beet diffusion juice. This treatment with carbon dioxide results in the formation of solid crystalline calcium carbonate crystals plus asosciated precipitates which remain in suspension. The temperature at which this carbonation takes place is not critical. The carbonation may in fact be carried forward at the temperature at which the filtrate is collected.

The carbonated filtrate is now treated with a small quantity of $SO_2$, generally from 50 to about 150 parts per million of juice, which serves to inhibit color formation. This is standard procedure in purification processes, and the amount of $SO_2$ employed varies widely with each individual plant. It should be noted that while the quantity of $SO_2$ employed may vary considerably, the pH should preferably not be lowered more than approximately 0.2. This limitation is necessary to insure the maintenance of the optimum pH range.

Without filtering and while the crystalline precipitate remains in the juice, the carbonated partially purified juice is evaporated to a density of from about 50° to 75° Brix. This step is a complete departure from the prior art. As previously explained, this evaporation step and the subsequent treatment in accordance with this invention may advantageously be applied to partially purified juice obtained from the second carbonation step of conventional double carbonation systems, or to any diffusion juice partially purified by liming and carbonation in which the juice contains crystalline precipitate. In cane sugar processing partial evaporation before carbonation has been carried out. Even in cane sugar processing, however, evaporation is not conducted beyond a maximum of 40° Brix. By evaporating significantly beyond the degree of evaporation heretofore employed at this stage in the processing of the sugar, the solid crystalline precipitate provides a nucleus for collecting other impurities and also has been found to scour the evaporator, thereby leaving the heating surface clean and unfouled. In this simple but unique manner then, a significant shortcoming of prior art sugar producing methods is obviated.

It should be noted, however, that this advantage is only attained when the evaporation is conducted while the precipitate remains in the limed and carbonated juice and when the degree of evaporation is restricted to 50° to 75° Brix. Extensive tests have shown that as the density is increased at which the juice is limed and carbonated the efficient use of lime for purification purposes is significantly increased. As a practical matter, evaporation below 50° Brix does not bring about a significant advantage. 75° Brix is the practical upper limit for evaporation because crystallization is initiated above this point and the increased viscosity causes reduced carbon dioxide adsorption in the subsequent liming and carbonation steps. If remelt sugars are to be added to the thickened juice for production of a standard liquor, it has been found desirable that the evaporation be conducted significantly below 75° Brix because the added remelt sugar increases the density and viscosity of the liquor. Consequently, when remelt sugar is added, the combination of evaporation and added remelt sugar should also bring the density to between about 50° and 75° Brix.

The thick juice prepared in accordance with the evaporation step is limed and carbonated to a pH value corresponding to a low lime salt content preferably the lowest lime salt content. In terms of pH values the alkalinity ranges from about pH 8.8 to pH 9.5 and is usually approximately pH 9.0. It should be noted that this pH value will vary with the particular juice being processed as determined by standard laboratory tests. During the liming and carbonation of the thickened juice alkalinity should not rise above pH 10.8 since above this point the thickened juice tends to gel and the carbon dioxide passes through the gel without reacting. During the liming and carbonation of the thick juice, temperature is preferably maintained at approximately 70° to 90° C., more preferably 75 to 85° C. This temperature range is not a critical limitation on the present invention but is highly desirable because at temperatures above 90° C. color formation occurs, and below 70° C. the reaction rate is considered prohibitively slow.

The amount of lime required for thick juice carbonation depends upon the purity of the original raw juice and the desired increased purification. There is a slight increase in purification as the amount of lime is increased up to a maxmum beyond which the increase is not significant. When the thick juice has a low purity, i.e. 80–83 percent, approximately 1 percent lime based on the weight of beets is used in the thick juice treatment. Juices of higher purity may be purified with approximately ½ percent lime to beet weight. The optimum amount of lime is determined by the quality of sugar desired and the cost of the lime. In this connection the quality of the sugar depends upon its color, turbidity of solutions, ash content, invert sugar content and sediment.

In the batch system the lime is preferably added simultaneuosly while carbonating at a rate sufficient to maintain the alkalinity substantially below that at which the juice forms a gel. This critical alkalinity takes as an upper limit pH 10.8 preferably pH 10.5. If a gel forms, the juice can no longer be carbonated. After the desired amount of lime is added, the carbonation continues to the desired value.

In the continuous liming-carbonation system for thick juices, the liming and carbonation is effected in a series of tanks. The number of tanks in the series is determined by the amount of lime required to obtain the desired optimum purity. With high purity juices, three to four tanks are generally necessary. With low purity juices, five to six tanks are required. The tanks are of sufficient size to permit approximately 15 minutes for each tank's retention time. The height of the tank is preferably sufficient to give a depth of liquor under carbonation of approximately 15 to 16 feet, plus ample space above the overflow level to permit foaming. All tanks in the series are preferably equal in size and dimensions, and are disposed relative to one another to permit gravity flow between tanks. The juice and added lime enter the first tank near the top flowing downward and outwardly from the bottom up to an overflow which controls the juice level in the tank, thence into the upper part of the next unit in the series. In each tank the lime is preferably added to the juice before the juice enters the carbonating tank, thus permitting alkalinity control of the thick juice entering the unit. The carbon dioxide gas supply line is substantially identical in construction to those employed in secondary carbonation processes.

Each tank receives approximately the same quantity of lime. The lime is added to each tank in an amount sufficient to maintain a pH value below that causing gelling. The pH at the top of the tank should preferably not exceed a value of approximately pH 10.5. The finished pH value for each tank should be the optimum as determined for low lime salt content.

The total quantity of lime including lime required for defecation, liming of the filtered juice and thick juice liming ranges from approximately 1 to 1½ percent lime based on the weight of beets processed. Double this quantity of lime is necessary in the conventional double carbonation methods heretofore used. Moreover, the purity of the finished juice is about 2 percent higher in the present system than in the conventional double carbonation system. Additionally, it has been found that the quality of the granulated sugar is increased due to a lower color and lower saponin content in the standard liquor.

If good quality sugar beets which yield a high purity filtered carbonated thick juice are employed, the granulated sugar may be crystallized directly. If lower quality beets are employed, the thick juice is evaporated to approximately 55° to 60° Brix. Remelt sugars are dissolved therein to give a syrup of about 70° Brix and the mixture carbonated in the manner described for thick juice. This method yields high grade standard liquor for production of granulated sugar.

After the liming and carbonation the temperature is raised to 85° to 95° C. for filtration, preferably employing pressure filters. This temperature range is not critical but has proven desirable in order to increase the rate of filtration. After filtration, the filtrate is then evaporated and crystallized to produce sugar.

Employing the new and novel steps of the present invention it is possible to employ significantly less lime than heretofore felt necessary in the purification of sugar beet diffusion juice, yet produce a product which is significantly superior to the product produced by conventional double carbonation methods.

In the following examples, the soluble solids in the juice is expressed in Brix as measured on the conventional Brix hydrometer scale; the color is expressed in terms of the percent absorbency as determined by the method of Morse and McGinnis reported in Industrial and Engineering Chemistry, Analytical Edition, volume 14 (1942), page 212; and the purity is the apparent purity in percent based on the ratio of sucrose, measured by polarization, to the soluble solids of the juice as measured on the Brix hydrometer scale.

A diffusion juice having the following properties was purified:

Soluble solids _____ ° Brix__ 13.4
Purity _____ percent__ 86.5
pH _____ 6.2

As a control the raw diffusion juice without prior processing was purified in the pilot carbonation plant of a beet sugar processing factory operating on the conventional Dorr continuous carbonation system. The same purification is obtained with the pilot plant as in the main factory on a larger scale. Ten gallons of the diffusion juice were purified using 2.5 percent by weight CaO based on the weight of beets diffused. The first carbonation was continued at 85° C. until a titratable alkalinity with 28 N acid to a phenolthalein end point of 0.80 was obtained. The alkalinity is expressed in terms of grams of CaO in 100 ml. of filtered juice, which is a measure commonly used in the industry. Second carbonation was conducted at 85° C. to an alkalinity of 0.005 gram CaO in 100 ml. of filtered juice. The filtered second carbonation juice was analyzed and the properties of the purified juice are stated in the table at the end of the example under the heading "Conventional Process."

Fifty gallons of the same untreated diffusion juice was then purified by the method of this invention. Milk of lime containing 10 percent by weight CaO was added to the juice contained in a metal tank in increments of one quart of lime at intervals of two minutes. The juice was slowly stirred by hand with a wooden paddle during addition of lime. The temperature of the juice was about 60° C. When pH 10.5 was obtained, the addition of lime to the fifty gallons of diffusion juice was reduced to half a quart at a time, and filtration tests were conducted on portions of diffusion juice to determine the optimum filtration rate. The amount of lime required to provide a most rapid test filtration rate of 80 ml. per minute with a four inch funnel and Reeve-Angel filter paper No. 266 was 0.25 percent by weight CaO based on the weight of beets diffused. The fifty gallons of limed diffusion juice was then filtered on the type of filter shown in Patent No. 2,880,875 and a filtration rate of 0.50 gallon per minute for each foot of filter cloth wetted was obtained.

A portion of the resulting filtrate was then carbonated in a large metal beaker to a pH of 10.0. Next 0.10 percent lime was added based on the weight of beets diffused. The juice was heated to 85° C., and then carbonated to pH 9.0. Next the temperature was raised to the boiling point and carbonation was continued for two minutes. The juice was then removed from the heater and $SO_2$ added at the rate of 100 parts per million based on the weight of juice.

The juice was evaporated to 70° Brix, removed from the evaporator, and simultaneously limed and carbonated at 80° C. to pH 9.0. The amount of lime added in this step was 0.65 per cent CaO based on the weight of beets diffused. The resultant thickened, carbonated and limed juice was then filtered on a Buehner funnel. The juice had the characteristics described in the following table under the heading "Thick Juice Process."

|  | Conventional Process | Thick Juice Process |
| --- | --- | --- |
| Total lime used | 2.5 | 1.0 |
| Color finished juice | .810 | .320 |
| Purity finished juice | 91.5 | 93.5 |

Original diffusion juice—86.5 purity. Hence, employing only 40 percent of the lime used in the conventional process, the present process produces a product of significantly improved purity and color.

In a second comparative test the present method for the purification of sugar beet diffusion juice was compared with the conventional double carbonation method for treating low purity beets in a non-Steffens factory using milk of lime at the rate of 2.86 percent milk of lime per weight of beets. The purity rise with the thick juice was 3 percent higher than the rise with the factory method.

In yet another test showing the superiority of the present method for purifying sugar beet diffusion juice, a thick juice from a diffusion juice prepared in accordance with the present invention was compared with the syrup produced by the same factory using the double carbonation system. The total amount of lime employed in the present method was 1.43 percent by weight of beets which was 50 percent of the quantity of lime employed by the factory. The perecntage purity increase between the diffusion juice and the prepared thick juice of 61.8° Brix was 7.4 percent. The increase in purity of the factory's juice was 3 percent. Hence, employing the present novel method for purifying beet diffusion juice, the quantity of lime employed is, on the average, approximately one-half the lime used in normal processing yet purity is significantly improved.

In another comparative test employing high purity beets processed in a Steffens house the present method was compared with factory results under substantially identical conditions. The results obtained when compared with factory operations on two consecutive days are tabulated in the following table. Saccharate milk was employed in the defecation and thick juice carbonation.

|  | Thick Juice Process | | Conventional Process | |
| --- | --- | --- | --- | --- |
|  | Run #1 | Run #2 | Run #1 | Run #2 |
| Diffusion juice purity | 89.12 | 89.01 | 89.12 | 89.01 |
| Total lime used/beets | 2.02 | 1.80 | 2.98 | 3.08 |
| Purity finished juice | 93.23 | 93.34 | 91.44 | 92.36 |
| Color index | 388.0 | 548.0 | 838.0 | 755.0 |
| Saponin, parts/million | 71.0 | 56.0 | 159.0 | 198.0 |
| Nitrogen, percent on dry thick juice | .45 | .47 | .53 | .50 |

These results clearly show that in addition to the decrease in lime employed and the increase in purity, there is a lowering of about 33 percent in color and a decrease of approximately 66 percent in the saponin content. This removal of the major portion of the saponin results in a granulated sugar of superior quality which meets the requirements for beverage grade sugar.

I claim:
1. In the purification of beet diffusion juice in which lime has been added to said juice and the juice has been carbonated, the improvement which comprises evaporating the limed and carbonated juice containing precipitate to between approximately 50° and 75° Brix to form a thick juice, liming and carbonating the thick juice at an alkalinity not exceeding the alkalinity at which the juice forms a gel, and then filtering the thick juice.

2. In the purification of beet diffusion juice in which lime has been added to said juice, the juice has been carbonated, and the carbonated juice has been treated with sulfur dioxide to inhibit color formation, the improvement which comprises evaporating the carbonated juice to between 50° and 75° Brix to form thick juice while said juice contains crystalline calcium carbonate precipitate, liming and carbonating the thick juice to the range of low lime salt content at an alkalinity not exceeding the alkalinity at which the juice forms a gel, and then filtering the thick juice.

3. The method of purifying beet diffusion juice which comprises adding lime to said juice in increments until a readily filterable precipitate is formed, filtering said juice to remove said precipitate, carbonating said filtered juice, adding lime to said juice in a quantity ranging from approximately 0.10 percent to 0.20 percent by weight of the sugar beets, carbonating the juice to the alkalinity at which a low lime salt content is present, treating the carbonated juice with sulfur dioxide to inhibit color formation, evaporating the carbonated juice containing precipitate to form a thickened juice of between about 50° and 75° Brix, liming and carbonating the thickened juice at an alkalinity not exceeding the alkalinity at which the juice forms a gel, and filtering the thickened juice.

4. The method of purifying beet diffusion juice which comprises adding lime to said juice in increments until a readily filterable precipitate is formed, filtering said juice to remove said precipitate,, carbonating said filtered juice, adding lime to said juice in a quantity ranging from approximately 0.10 percent to 0.20 percent by weight of the sugar beets, carbonating the juice to a pH of between about 8.8 and 9.5 at which a low lime salt content is present, treating the carbonated juice with sulfur dioxide to inhibit color formation, evaporating the carbonated juice containing precipitate to form a thickened juice of between about 50° and 75° Brix, liming and carbonating the thickened juice at an alkalinity not exceeding the alkalinity at which the juice forms a gel, and filtering the thickened juice.

5. The method of purifying beet diffusion juice which comprises adding lime to said juice in increments until a readily filterable precipitate is formed, filtering said juice to remove said precipitate, carbonating said filtered juice, adding lime to said juice in a quantity ranging from approximately 0.10 percent to 0.20 percent by weight of the sugar beets, carbonating the juice to the alkalinity at which a low lime salt content is present, treating the carbonated juice with sulfur dioxide to inhibit color formation, evaporating the carbonated juice containing precipitate to form a thickened juice of between about 50° and 75° Brix while said juice contains crystalline calcium carbonate precipitate, liming and carbonating the thickened juice at an alkalinity not exceeding the alkalinity at which the juice forms a gel, and filtering the thickened juice.

6. The method of purifying beet diffusion juice which comprises adding lime to said juice in increments until a readily filterable precipitate is formed, filtering said juice to remove said precipitate, carbonating said filtered juice, adding lime to said juice in a quantity ranging from approximately 0.10 percent to 0.20 percent by weight of the sugar beets, carbonating the juice to the alkalinity at which a low lime salt content is present, treating the carbonated juice with sulfur dioxide to inhibit color formation, evaporating the carbonated juice containing precipitate to form a thickened juice of between about 50° and 75° Brix while said juice contains crystalline calcium carbonate precipitate, liming and carbonating the thickened juice at an alkalinity not exceeding a pH of 10.8 and below that at which the juice forms a gel, and filtering the thickened juice.

7. The method of purifying beet diffusion juice which comprises adding lime to said juice in increments until a readily filterable precipitate is formed, filtering said juice to remove said precipitate, carbonating said filtered juice to reduce its alkalinity to between about pH 9.5 and 10.0, adding lime to said juice in a quantity ranging from approximately 0.10 percent to 0.20 percent by weight of the sugar beets to provide a low lime salt content, carbonating the juice to an alkalinity of between about pH 8.8 and 9.5 at which a low lime salt content is present, treating the carbonated juice with sulfur dioxide to inhibit color formation, evaporating the carbonated juice containing precipitate to form a thickened juice of between about 50° and 75° Brix while said juice contains crystalline calcium carbonate precipitate, adding to the juice between about 0.5 and 1.0 percent lime based on the weight of beets diffused, carbonating the thickened juice at an alkalinity not exceeding a pH of 10.8 and below that at which the juice forms a gel, continuing said addition of lime and carbonating until the alkalinity of the juice is between about pH 8.8 and 9.5 at which the juice has a low lime salt content, and filtering the thickened juice, the total quantity of lime added to said juice being between about 1 to 1.5 percent based on the weight of beets diffused.

References Cited in the file of this patent

UNITED STATES PATENTS 2,976,189    Alston _____ Mar. 21, 1961

FOREIGN PATENTS 153,323    Great Britain _____ Sept. 23, 1953
523,268    Great Britain _____ July 10, 1946